US012688346B1

(12) United States Patent
Wolfovitz et al.

(10) Patent No.: US 12,688,346 B1
(45) Date of Patent: Jul. 21, 2026

(54) METHOD AND APPARATUS FOR MUTATION COVERAGE TESTING WITH INCREMENTAL SAT QUERIES

(71) Applicant: Cadence Design Systems, Inc., San Jose, CA (US)

(72) Inventors: Guy Wolfovitz, Haifa (IL); Ramanuj Chouksey, Noida (IN); Amit Verma, Noida (IN); Habeeb Anton Farah, Haifa (IL)

(73) Assignee: Cadence Design Systems, Inc., San Jose, CA (US)

( * ) Notice: Subject to any disclaimer, the term of this patent is extended or adjusted under 35 U.S.C. 154(b) by 650 days.

(21) Appl. No.: 18/335,943

(22) Filed: Jun. 15, 2023

(51) Int. Cl.
*G06F 30/3323* (2020.01)
*G06F 30/337* (2020.01)
*G06F 119/16* (2020.01)

(52) U.S. Cl.
CPC ........ *G06F 30/3323* (2020.01); *G06F 30/337* (2020.01); *G06F 2119/16* (2020.01)

(58) Field of Classification Search
None
See application file for complete search history.

(56) References Cited

U.S. PATENT DOCUMENTS

| | | | |
|---|---|---|---|
| 8,099,695 B1* | 1/2012 | Lehavot | G06F 30/398 |
| | | | 716/111 |
| 8,527,922 B1* | 9/2013 | Baumgartner | G06F 30/3323 |
| | | | 703/2 |
| 8,863,049 B1* | 10/2014 | Lundgren | G06F 30/3323 |
| | | | 716/106 |
| 9,626,468 B2* | 4/2017 | Cerny | G06F 30/3323 |
| 11,941,335 B1* | 3/2024 | Verma | G06F 30/31 |
| 2023/0094798 A1* | 3/2023 | Beadnell | G06F 30/3308 |
| | | | 716/106 |

* cited by examiner

*Primary Examiner* — Leigh M Garbowski
(74) *Attorney, Agent, or Firm* — Foley & Lardner LLP

(57) ABSTRACT

A solution for performing incremental mutation coverage testing is disclosed. The solution can identify, for a cycle of a test, a first signal not covered during preceding cycles of the test and select, for the current cycle, a first value for the first signal. The solution can, responsive to the first value, determine whether the first signal is covered by the test in the current cycle and identify whether a first assertion not covered during the one or more preceding cycles is covered in the current cycle. The solution can remove the first signal from a list of signals if it determines that it is not covered by the test and remove the first assertion from a list of assertions if the first assertion is determined to be covered. The system can identify, for a next cycle, a second signal from the updated one or more signals for the circuit.

20 Claims, 7 Drawing Sheets

600

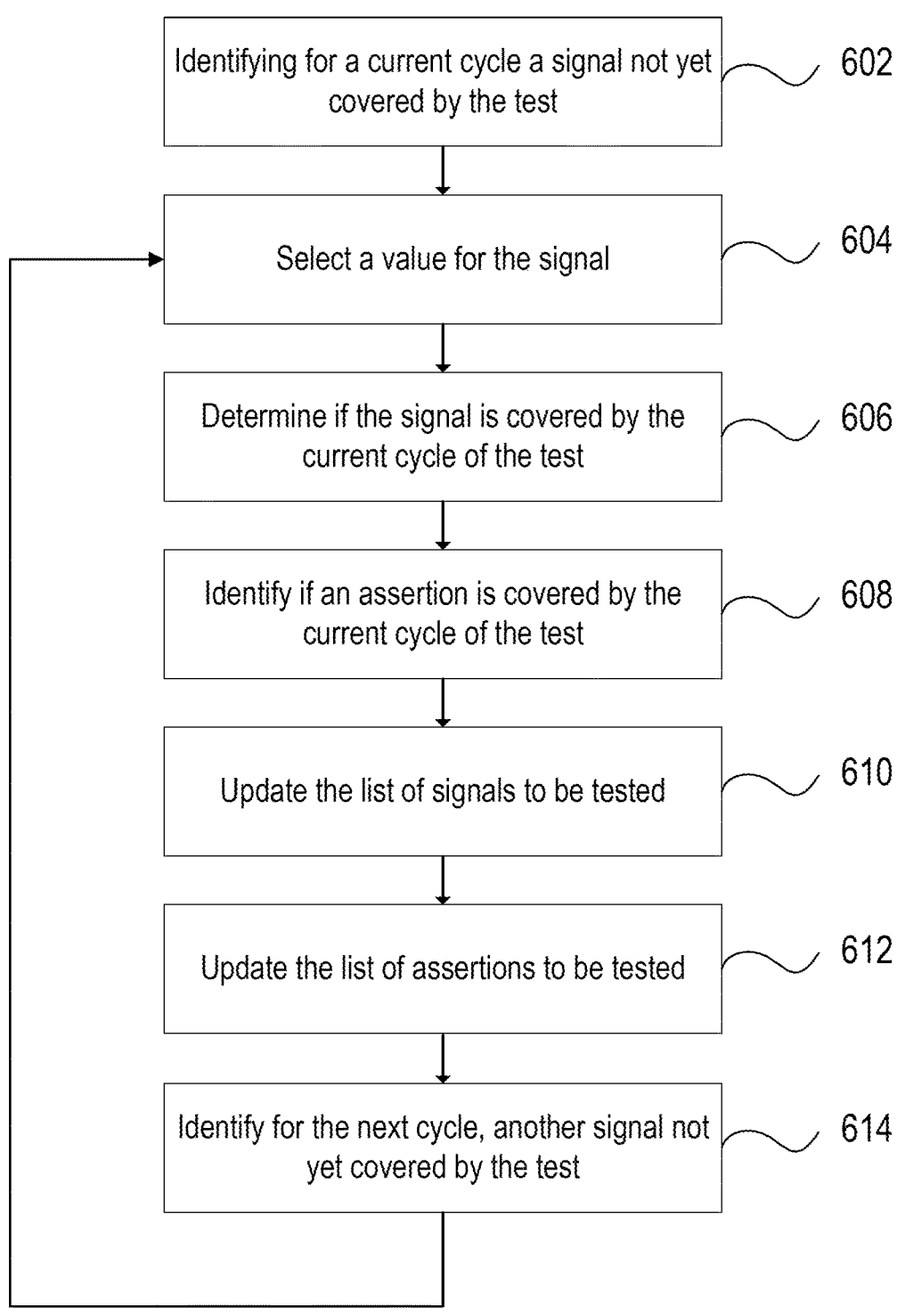

Identifying for a current cycle a signal not yet covered by the test — 602

Select a value for the signal — 604

Determine if the signal is covered by the current cycle of the test — 606

Identify if an assertion is covered by the current cycle of the test — 608

Update the list of signals to be tested — 610

Update the list of assertions to be tested — 612

Identify for the next cycle, another signal not yet covered by the test — 614

FIG. 6

METHOD AND APPARATUS FOR MUTATION COVERAGE TESTING WITH INCREMENTAL SAT QUERIES

TECHNICAL FIELD

The present disclosure generally relates to systems and methods for testing assertion coverage of a circuit, including but not limited to determining assertion coverage via mutation coverage analysis utilizing incremental Boolean satisfiability (SAT) queries.

BACKGROUND

Verification is an integral aspect of developing electronic circuits and circuit boards. When testing a functional design, it is helpful to be able to test the design's connections and communications with other components in hardware so that the designer can validate that the functional design can work and meet technical standards. However, in order to determine the effectiveness of a particular test on a given design circuit, the verification effort may determine the coverage of the circuit design in relation to various aspects of the test.

SUMMARY

The present disclosure is directed to a solution for determining assertion coverage of a design under test utilizing mutation coverage testing based on incremental SAT queries. Model checking can be used to verify whether a given design circuit under test satisfies a given set of properties (i.e., assertions) that can specify different desired behavior of the design circuit. Once the design circuit is proven to satisfy a given property (i.e., an assertion), a determination can be made to establish which parts of the design the assertion has actually exercised, or verified. However, implementation of mutation coverage solutions can be resource intensive and time consuming partly because it can be challenging to share the problem axioms and learned clauses between the prior and subsequent or concurrent executions or runs, thereby resulting in many signals and assertions being processed in multiple runs or executions.

The present solution overcomes these challenges by determining assertion coverage for a design circuit using a shared SAT solver and incremental SAT queries which allows the solution to benefit from the sharing of problem axiom and learned clauses across the processing of different signals and assertions. The present solution can utilize a loop (e.g., a while or recursive loop) to incrementally test different signals and assertions of a design circuit and remove from the list of signals and/or assertions yet to be tested, only those signals and/or assertions for which coverage is established during any of the increments (cycles) of the test. For example, the present solution can utilize a loop to incrementally test different signals and assertions, removing from the list of signals yet to be tested only those signals for which coverage is established during either the present or prior increments (cycles), thereby ensuring that all covered signals are found. In doing so, the present solution avoids standalone and independent testing of signals, thereby reducing the number of executions to perform and the size of the setup overhead in the executions executed, resulting in a faster, more efficient and more-effective mutation coverage solution.

In some aspects, the present solution relates to a system to perform incremental mutation coverage testing of a circuit. The system can include at least one processor coupled with memory. The at least one processor can be configured to identify, for a current cycle of a plurality of cycles of a test for a circuit, a first signal of one or more signals for the circuit. The first signal can be not covered during one or more preceding cycles of the plurality of cycles preceding the current cycle. The at least one processor can be configured to select, for the current cycle, a first value for the first signal. The at least one processor can be configured to determine, in response to the first value selected for the first signal for the circuit, whether the first signal is covered by the test in the current cycle. The at least one processor can be configured to identify, in response to the first value selected for the first signal for the circuit, whether a first assertion of a plurality of assertions not covered during the one or more preceding cycles is covered by the test in the current cycle. The at least one processor can be configured to update the one or more signals to remove the first signal from the one or more signals if the first signal is determined to be covered by the test. The at least one processor can be configured to update the one or more assertions to remove the first assertion from the one or more assertions if the first assertion is determined to be covered by the test. The at least one processor can be configured to identify, for a next cycle following the current cycle, a second signal from the updated one or more signals for the circuit.

The test can be a mutation coverage test for the circuit implemented in a hardware description language (HDL) and/or integrated with one or more verification environment components. The assertion can include a System Verilog Assertion (SVA) corresponding to one or more cycles of a clock of the circuit. The at least one processor can be configured to set, for the duration of the cycle, the first signal to a mutated signal value. The at least one processor can be configured to determine that the first signal is covered by the test based on the mutated signal value remaining unchanged for the duration of the current cycle.

The at least one processor can be configured to identify that the first assertion is covered by the test based on at least the first assertion verifying the first signal. The at least one processor can be configured to provide a current counter value from a plurality of counter values corresponding to the plurality of cycles, the current counter value corresponding to the current cycle. The at least one processor can be configured to identify the first signal according to the current counter value.

The at least one processor can be configured to increase the current counter value to a next counter value of the plurality of counter values. The at least one processor can be configured to determine whether the next counter value remains below a threshold of the counter values. The at least one processor can be configured to identify, responsive to the next counter value remaining below the threshold of the counter values, a second signal of the updated one or more signals to use during the next cycle of the test.

The at least one processor can be configured to select, for a next cycle following the current cycle, the first value for a second signal of the updated one or more signals. The at least one processor can be configured to determine, in response to the first value selected for the second signal for the circuit, whether the second signal is covered by the test in the next cycle. The at least one processor can be configured to identify, in response to the first value selected for the second signal for the circuit, whether a second assertion of the updated one or more assertions is covered by the test in the next cycle. The at least one processor can be configured to update the updated one or more signals to remove the second signal from the one or more signals if the second signal is determined to be covered by the test. The at least one processor can be configured to update the updated one or more assertions to remove the second assertion from the one or more assertions if the second assertion is determined to be covered by the test.

In some aspects, the present solution relates to a method for incremental mutation coverage testing of a circuit. The method can include at least one processor performing a current cycle of a plurality of cycles of a test for a circuit identifying a first signal of one or more signals for the circuit. The first signal can be not covered during one or more preceding cycles of the plurality of cycles preceding the current cycle. The method can include the at least one processor for the current cycle selecting a first value for the first signal. The method can include the at least one processor determining, in response to the first value selected for the first signal for the circuit, whether the first signal is covered by the test in the current cycle. The method can include the at least one processor identifying, in response to the first value selected for the first signal for the circuit, whether a first assertion of a plurality of assertions not covered during the one or more preceding cycles is covered by the test in the current cycle. The method can include the at least one processor updating the one or more signals to remove the first signal from the one or more signals if the first signal is determined to be covered by the test. The method can include the at least one processor updating the one or more assertions to remove the first assertion from the one or more assertions if the first assertion is determined to be covered by the test. The method can include the at least one processor identifying, for a next cycle following the current cycle, a second signal from the updated one or more signals for the circuit.

The test can be a mutation coverage test for the circuit implemented in a hardware description language (HDL) and integrated with one or more verification environment components. The assertion can include a System Verilog Assertion (SVA) corresponding to one or more cycles of a clock of the circuit. The method can include the at least one processor setting, for the duration of the cycle, the first signal to a mutated signal value. The method can include the at least one processor determining that the first signal is covered by the test based on the mutated signal value remaining unchanged for the duration of the current cycle.

The method can include the at least one processor identifying that the first assertion is covered by the test based on the first assertion verifying the first signal. The method can include the at least one processor providing a current counter value from a plurality of counter values corresponding to the plurality of cycles. The current counter value can correspond to the current cycle. The method can include the at least one processor identifying the first signal according to the current counter value.

The method can include the at least one processor increasing the current counter value to a next counter value of the plurality of counter values. The method can include the at least one processor determining, by the at least one processor, whether the next counter value remains below a threshold of the counter values. The method can include the at least one processor identifying, responsive to the next counter value remaining below the threshold of the counter values, a second signal of the updated one or more signals to use during the next cycle of the test.

The method can include the at least one processor selecting, for a next cycle following the current cycle, the first value for a second signal of the updated one or more signals. The method can include the at least one processor determining, in response to the first value selected for the second signal for the circuit, whether the second signal is covered by the test in the next cycle. The method can include the at least one processor identifying, in response to the first value selected for the second signal for the circuit, whether a second assertion of the updated one or more assertions is covered by the test in the next cycle. The method can include the at least one processor updating the updated one or more signals to remove the second signal from the one or more signals if the second signal is determined to be covered by the test. The method can include the at least one processor updating the updated one or more assertions to remove the second assertion from the one or more assertions if the second assertion is determined to be covered by the test.

A non-transitory computer readable medium storing program instructions. The instructions can be for causing at least one processor to identify, for a current cycle of a plurality of cycles of a test for a circuit, a first signal of one or more signals for the circuit. The first signal can be not covered during one or more preceding cycles of the plurality of cycles preceding the current cycle. The instructions can be for causing the at least one processor to select, for the current cycle, a first value for the first signal. The instructions can be for causing the at least one processor to determine, in response to the first value selected for the first signal for the circuit, whether the first signal is covered by the test in the current cycle. The instructions can be for causing the at least one processor to identify, in response to the first value selected for the first signal for the circuit, whether a first assertion of a plurality of assertions not covered during the one or more preceding cycles is covered by the test in the current cycle. The instructions can be for causing the at least one processor to update the one or more signals to remove the first signal from the one or more signals if the first signal is determined to be covered by the test. The instructions can be for causing the at least one processor to update the one or more assertions to remove the first assertion from the one or more assertions if the first assertion is determined to be covered by the test. The instructions can be for causing the at least one processor to identify, for a next cycle following the current cycle, a second signal from the updated one or more signals for the circuit.

The test can be a mutation coverage test for the circuit implemented in a hardware description language (HDL) and/or integrated with one or more verification environment components. The assertion can include a System Verilog Assertion (SVA), e.g., corresponding to one or more cycles of a clock of the circuit. The instructions can be for causing the at least one processor to set, for the duration of the cycle, the first signal to a mutated signal value. The instructions can be for causing the at least one processor to determine that the first signal is covered by the test based at least on the mutated signal value remaining unchanged for the duration of the current cycle.

BRIEF DESCRIPTION OF THE DRAWINGS

These and other aspects and features of the present embodiments will become apparent to those ordinarily skilled in the art upon review of the following description of specific embodiments in conjunction with the accompanying figures.

FIG. 6 illustrates an example flow diagram of a method for performing incremental mutation coverage testing of a circuit, in accordance with the embodiments of the present solution.

DETAILED DESCRIPTION

Figure 1:
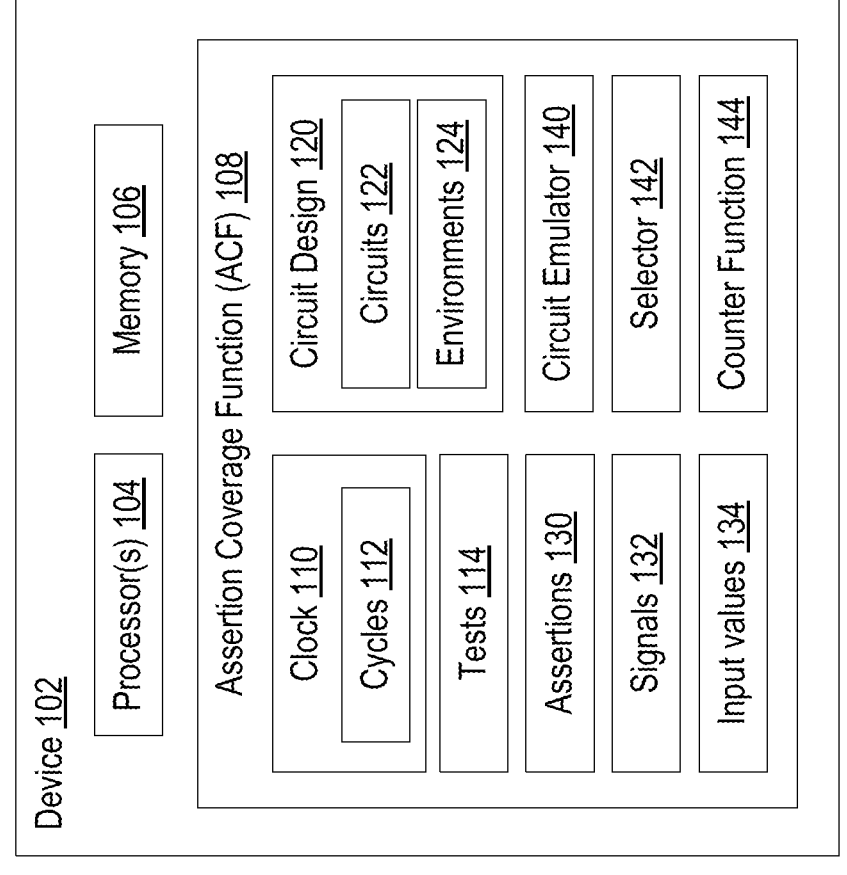
FIG. 1 is an example block diagram of a system to perform incremental mutation coverage testing of a circuit.

The present embodiments shall now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The present disclosure is directed to a solution for determining assertion coverage of a design circuit being tested using mutation coverage testing based on incremental SAT queries. Model checking can be used to verify whether a given design circuit being tested satisfies a given set of properties (i.e., assertions) of the test. The set of properties, or assertions, can specify various desired behavior of the design circuit, which could be tested. Once the design circuit is proven to satisfy a given property, (i.e., an assertion), a determination can be made to establish which parts of the design circuit the assertion has actually exercised, or verified. Determining which parts of the tested design circuits a set of assertions have verified during the test can be referred to as an assertion coverage problem, and its solution could aid with verification closure.

An example of an assertion coverage problem can include a circuit design provided in the form of a sequential circuit (e.g., a Verilog design) along with a verification environment that can include or reflect various assumptions defining or constraining the behavior of the circuit design. The assertion coverage problem can also include a set of valid temporal assertions, which can be implemented in the form of a System Verilog Assertion (SVA) and a set of circuit signals, which can be provided in the form of Verilog signals for the circuit design. The assertion coverage problem can be used to determine which of the circuit signals of the overall design are such that, when replaced in the design circuit with a fresh free input, will cause at least one of the valid assertions in to fail. Those signals that cause at least one of the valid assertions to fail can be determined to be the signals which the assertions actually exercised, verified, or covered, during the test, whereas other signals can be considered not verified, or not covered by the assertions.

Mutation coverage can provide a solution to an assertion coverage problem by manipulating the circuit design to create a mutated circuit via modified signals set to particular input values (e.g., mutation points). For example, a mutation coverage solution can provide, for each signal of the design, two fresh free input values to the circuit: $m_p$, and $i_p$. The signal in the circuit design can be replaced by a selector, whose control can be set to a new input $m_p$, and which can select between a driver of the input value (e.g., if $m_p$ is low) and a new input $i_p$ (e.g., if $m_p$ is high). Moreover, the mutation coverage solution can include an assumption specifying that exactly one of the mutation points (e.g., an $m_p$) is high, and that all mutation points are stable (e.g., every mutation point remains constant for the entire execution of the sequential circuit). The effect of this assumption can be that for every execution of the sequential circuit, exactly one mutation point $m_p$ is high for the entire execution, causing exactly one signal to be replaced by a value of a free input. As a result, a mutation point $m_p$ for a particular signal that is high throughout a counterexample to an assertion (e.g., a failure of an assertion) can indicate that the assertion for which the counterexample is established exercises, or verifies, the particular signal being tested (e.g., mutated). Thus, in order to solve the assertion coverage problem for the entire circuit, one is to find all signals of the circuit design for which there exists a counterexample of an assertion to the circuit design being tested for which the mutation point $m_p$ is high throughout the counterexample.

Providing mutation coverage solutions however can be very challenging, resource intensive and time consuming. For example, a solution can verify signals using a sequence of model checking queries to identify counterexamples to assertions for which certain signal mutation points remain high throughout the execution and then remove such signals from the set of signals to be verified further. Similarly, the solution can remove an assertion from the list of assertions to verify once a proof has been found for the given assertion using a particular invocation of a model checker. This process can be repeated until either all signals or all assertions have been removed, thereby reporting to the user only those signals/points that are verified or covered by some assertion-which can be very resource-intensive and time-consuming given the complexity and the number of signals and assertions included in modern circuit designs. The problem can be also further exacerbated by the fact that different executions of the model checking algorithms can be excluded (e.g., internal SAT solver instances not shared) with other executions or instances of the execution, thereby resulting in some SAT instances being partially or fully constructed and processed multiple times for different signals or assertions.

Consequently, model checking solutions can involve a large overhead due to the need of each algorithm's execution to reconstruct and relearn many, if not most, of the model checker's solver's axiom and learned clauses between the prior and subsequent or concurrent executions or runs. Even in the best case scenario, where a model checking algorithm processes all assertions in one execution, solver instances and learned clauses can still be reconstructed and relearned as the number of assertions can typically be orders of magnitude smaller than the number of signals in the circuit design. Similarly, model checking solutions can also include a large setup overhead since each execution of a model checking algorithm can include a setup and a sequence of reductions for it to execute correctly and efficiently and the number of signals can be much larger than the number of assertions. As a result, providing fast and efficient mutation coverage testing solutions can be difficult to achieve.

The present solution overcomes these challenges by providing an assertion coverage solution for design circuits using one shared SAT instance, and incremental SAT queries to this instance, allowing the solution to avoid relearning and reconstructing prior axiom and learned clauses. In doing so, the present solution incrementally (e.g., via a while loop) tests different signals and assertions of a design circuit and removes from the list of signals and assertions only those for which coverage is established during any one of the increments (cycles) of the test. The present solution achieves the assertion coverage determination incrementally (e.g., cycle by cycle) thereby taking advantage of sharing axiom and learned clauses across all SAT queries, thereby reducing the time to find all covered signals, and consequently reducing the time to solve the assertion coverage problem.

FIG. 1 is a block diagram of an example system 100 for performing incremental mutation coverage testing of a circuit design. The example system 100 can include a device 102 (e.g., a computing device, such as a server) including one or more one or more processors 104, memories 106 and/or assertion coverage functions 108. An assertion coverage function 108, also referred to as an ACF 108, can include one or more clocks 110 providing cycles 112. ACF 108 can include one or more circuit designs 120 including one or more circuits 122 and environments 124. ACF 108 can include one or more tests 114, assertions 130, signals 132, input values 134, circuit emulators 140, selectors 142 and counter functions 144.

At a high level, a system 100 can utilize the one or more processors 104 and instructions from memory 106 to cause an ACF 108 to use a circuit emulator 140 to perform an incremental mutation coverage test 114 on a circuit design 120. For example, an ACF 108 can utilize a circuit emulator 140 to test or verify assertions 130 and signals 132 associated with the circuit design 120 (and its circuits 122 and environments 124) over a series of cycles 112 of a clock 110. ACF 108 can use a counter function 144 to provide or maintain a loop (e.g., a while loop) of cycles 112 of the test 114 in order to keep track of assertions 130 and signals 132 not yet verified during the current or prior cycles 112 of the test 114. ACF 108 can test individual signals 132 and assertions 130 of the circuit design 120 using a selector 142 to assign input values 134 to particular signals 132 being tested (e.g., mutation points) in order to identify those signals 132 and assertions 130 that are verified or covered (e.g., proven) by the test 114 during the current cycle 112. ACF 108 can keep track of the assertions 130 and signals 132 verified by the test 114 over the cycles 112, until, for example, either signals 132 or assertions 130 have all been tested. In doing so, the system 100 can keep track of the signals 132 and assertions 130 already verified during the prior cycles 112 of the test 114, thereby avoiding repetitive processing of the already processed or verified signals 132 and assertions 130, improving the speed and efficiency of the mutation coverage test.

Device 102 can include any combination of hardware and software for providing computational functionality to a user, such as any computing device (e.g., a computer or a workstation, a server, or a cloud-based virtual work station). Device 102 can provide a user with a virtual workstation or a virtual application to allow the user to access and use the circuit emulator 140 from the device 102 or another network device connected to the device via a network (e.g., the internet). Device 102 can include a software as a service platform on a cloud-based system or a virtual server or workstation. Device 102 can include any number of processors 104 and memories 106 communicatively coupled with each other and performing instructions related to the implementation or functionalities of the ACF 108.

Processor(s) 104 can include any processing circuit or a system, such as a processor, that executes the software command(s) that the user can input into device 102. The processor 104 can utilize instructions or commands stored in memory 106 to execute or operate an ACF 108 or any of its functions or embodiments. For example, the processor 104 can generate, execute, process and provide instructions or commands for a circuit design 120, circuit emulator 140, clock 110, tests 114, counter function 144, selector 142, assertions 130, signals 132 and input values 134. Processor 104 can execute a test 114 over a number of cycles 112, such as in accordance with a counter (e.g., while loop) of a counter function 144. Processor 104 can retrieve instructions or commands from memory 106 to identify, access, process, monitor and update the assertions 130 and signals 132, including keeping track of the assertions 130 and signals 132 verified or covered (e.g., proven), or not yet verified or covered (e.g., not yet proven) by an ongoing test (e.g., during one or more prior or current cycles 112). Processor 104 can execute the functionalities of any communications with another network device, such as via an internet or network connection, including a user device generating or issuing commands or instructions for an ACF 108 or circuit emulator 140, or another server or a virtual machine, or an application interacting with an ACF 108 or circuit emulator 140.

Memory 106 can include any one or more devices or circuits for storing information or data. Memory 106 can include static or dynamic memory, storage memory devices or processing memory. Memory 106 can include a random access memory (RAM), dynamic RAM (DRAM), static RAM (SRAM), synchronous DRAM (SDRAM), double data rate (DDR) DRAM or any other type of RAM memory. Memory 106 can include read only memory (ROM), programmable ROM (PROM), erasable PROM (ERPOM), electrically erasable PROM (EEPROM), or any other type of ROM memory. Memory 106 can include a flash memory, a cache memory of a processor 104, hard drives or any other type of device storing data and providing access to stored data. Memory 106 can store instructions, commands or data for processing or executing any feature or a functionality of an ACF 108, including, or corresponding to, for example the clock 110, cycles 112, tests 114, circuit design 120 (e.g., circuits 122 and environments 124), assertions 130, signals 132, input values 134, circuit emulator 140, selector 142 and counter function 144.

Assertion Coverage Function (ACF) 108 can include any combination of hardware and software for testing, validating or determining assertion coverage of a circuit design 120 using mutation coverage based on incremental SAT queries. For example, ACF 108 can include the functionality to implement an incremental mutation coverage test 114 for a circuit design 120 (e.g., circuits 122 and environments 124) and its signals 132. For example, ACF 108 can include the functionality to establish and maintain counters (e.g., via counter function 144) for counting clock cycles (e.g., cycles 112) of a circuit design 120 processing in a circuit emulator 140 and determining mutation coverage per each individual cycle 112. ACF 108 can include or provide a selector 142 to insert or apply input values 134 for various signals 132 of a circuit design 120. ACF 108 can include the functionality to test change, effects, outputs or variability of input values 134 for various signals 132. ACF 108 can include the functionality to determine whether input values 134 change, vary or otherwise provide outputs indicative of the coverage of one or more signals 132 and/or one or more assertions 130 on a cycle 112 by cycle 112 basis (e.g., per individual while loop counter). For example, ACF 108 can include the functionality to test, during a particular cycle 112 corresponding to a count by a counter function 144 (e.g., a loop of a while loop, for loop or a do-while loop) whether a particular signal 132 and/or a particular assertion 130 is covered (e.g., proven) by the test 114 during a particular cycle 112.

ACF 108 can include the instructions, commands and/or data implemented by a processor 104 to solve a mutation coverage of a particular circuit design 120 using incremental SAT (e.g., Boolean satisfiability) queries. For example, ACF 108 can include inputs comprising assertions 130 and signals 132 for a given circuit design 120. The counter function 144 can establish a counter value "i" to start processing at a value of zero (e.g., i=0 on the count of the cycles 112) and implement an incremental counter function for any number of cycles 112 for the value "i" to increase (e.g., cycle by cycle) up to an upper bound (e.g., upper bound value "d" for the value "i" on the diameter of the test 114). For example, while the count or number of signals 132 and assertions 130 that are not yet tested by the test 114 is greater than zero and while the value "i" is less than the upper boundary "d", the ACF 108 can implement a number of processing actions or steps.

For example, ACF 108 can increase the count of the "i" value, so that i=i+1. For example, ACF 108 can utilize the circuit design 120, including the circuits 122 and environments 124, and can implement the cycle 112 up to a cycle corresponding to the value "i". ACF 108 can implement the clause or functionality specifying that some assertions 130 correspond to the current cycle (e.g., cycle corresponding to value i). For example, ACF 108 can implement the clause or functionality specifying that some input value 134 is set to a high value for the duration of the cycle 112 (e.g. cycle corresponding to value i). While the ACF 108 utilizes the circuit design 120 at the cycle 112 corresponding to cycle i, the clause specifying assertions 130 corresponding to the same cycle 112 and the input value 134 is set to a high value for the duration of the same cycle 112, ACF 108 can let input value 134 replace a signal 132 and can determine if the signal is verified (e.g., unchanged for the duration of the cycle 112). If the ACF 108 determines that the signal 132 is verified, the signal can be removed from the list of signals 132 to test or verify. If an assertion 130 is determined to be verified with the signal 132, the assertion can be removed from the list of assertions 130 to verify, and the cycle 112 can end. Then, ACF 108 can move to the next cycle 112 (e.g., i=1) and start the cycle again.

The ACF 108 functionality can also be shown or reflected using the below example of the pseudo-code instructions that can be implemented using the example system 100:

```
ACF 108 methodology: Incremental_Mutation_Coverage (A, P)
Function input: Assertions "A"; Signals "P".
   1    Let counter i = 0, and d an upper bound on the diameter of the
        test/model.
   2    ACF 108 function can implement, while A and P are non-empty
        and i < d do:
   3        Let i = i + 1.
   4        Let f represent the circuit and environment up to cycle i.
   5        Let B be clause specifying that some assertion in A fails on
            cycle i.
   6        Let D be clause specifying that some m_p, for p ∈ P, is high on
            cycle i.
   7        while f ˆB ˆ D is satisfiable do
   8            Let p ∈ P be a signal s.t. m_p is true in the satisfying
                assignment.
   9            Report p as verified, or covered.
   10           Remove p from P and rebuild D.
   11       end while
   12   end while
```

Using such instructions, ACF 108 can process, validate and/or verify a set of assertions 130 (i.e., assertions A) and the set of signals 132 (e.g., signals P) in connection with a mutation coverage test 114 for a circuit design 120. ACF 108 can execute a mutated circuit design 120 (e.g., mutated circuit C'). The mutated circuit design 120 can include mutated input values 132 and/or modified environments 124. For each mutation variation, the ACF 108 can determine or identify signals 132 (e.g., signals P) for which there is a counterexample to some assertion 130 (i.e., assertion A) in the group of assertions 130 yet to be verified or tested. For example, the ACF can determine or identify a signal 132 for which an input value 134 for the signal 132 remains high throughout the counterexample. Once ACF 108 identifies all of the covered signals 132 and/or assertions 130 covered during the cycle 112 (e.g., for a particular value i of the while loop), the ACF 108 can remove from the group of the signals 132 and/or assertions 130 yet to be tested, those signals 132 and/or assertions 130 covered during the present cycle 112 (e.g., during the current i value of the while loop). ACF 108 can perform these steps or functionalities for each cycle 112 (e.g., each i value of the while loop) until the test 114 runs out of the assertions 130 or signals 132 yet to be tested or covered.

In doing so, the ACF 108 can maintain a single SAT instance, which at the $i^{th}$ iteration represents the unrolled model (e.g., the sequential design circuit 120) up to cycle 112 corresponding to the value i of the loop. The single SAT instance can be built by the ACF 108 incrementally, such that the same axiom clauses used at iteration "i" is considered, accounted for or reused at iteration i+1. Likewise, the ACF 108 can allow for the learned clauses established, implemented or determined while solving the SAT instance to be accounted for, considered or reused at subsequent solves within the same iteration, or across subsequent iterations. The single SAT instance can be executed by the ACF 108 only once and across the plurality of cycles 112 to address all the signals 132 or assertions, thereby allowing for the setup overhead to remain minimal, improving the efficiency of the mutation coverage solution. In some embodiments, as a benefit of the present solution, the ACF 108 can create the mutated design circuit 120 without the additional assumption constraining the mutation points to be onehot and stable. ACF 108 can move the encoding of this assumption and improve the performance, as the setup and reductions performed before the method is executed may not need to deal with the complex onehot/stable assumption.

Onehot assumption for a set of mutation points $\{m_1, m_2, \ldots, m_k\}$ can include an assumption that specifies that on every cycle of the execution of the sequential circuit, exactly one of the mutation points $\{m_1, m_2, \ldots, m_k\}$ is high. For example, it could be a different mutation point that is high in each cycle. A stable assumption for a mutation point m can include the mutation point that is constant (either high, or low) throughout the execution of the sequential circuit, i.e., without changing its value (from high to low, or from low to high). When used together, these two assumptions can allow exactly one signal to be mutated in every sequential run. Such assumptions (e.g., the onehot assumption) can be complex and incur an overhead for proof setup and processing of signals and asserts by model checkers. Using the present solution, these assumptions can be modeled directly inside the SAT solver, therefore removing part of the complexity otherwise introduced when defining these assumptions prior to the proof setup.

Clock 110 can include any timing circuit (e.g., clock or a clock signal) for synchronizing actions or processes of a digital circuit, such as a processor 104. Clock 110 can include a signal oscillating between a high state and a low state (e.g., a cycle 112) and can be used for driving step by step operations of an ACF 108 (e.g., or its tests 114). Clock 110 can include any signal or a variable corresponding to processing of a circuit design 120 within a circuit emulator 140. For example, clock 110 can provide the current value of the simulated time during the testing, validation or emulation of a circuit design 120. Clock 110 can include a value or parameter corresponding to a clock time at a particular stage (e.g., cycle) of the test 114 with respect to a circuit design 120 implemented within a circuit emulator 140. Clock 110 can provide any number of cycles 112 for running or executing a test 114 for a circuit design 120. A cycle 112 can correspond to a single period or cycle of the clock 110, such as a particular processing cycle of a circuit design 120 in accordance with a test 114.

Circuit emulator 140 can include any combination of hardware and software for testing, validating, behaving or acting as, or otherwise performing emulation of, a design circuit 120 and its circuits 122 or environments 124. Design circuit 120 can include a circuit 122, such as a test circuit, a processor, a microcontroller, a field programmable gate array (FPGA), a system-on-chip (SoC), an application specific integrated circuit (ASIC), one or more subsystems and/or IP blocks. Design circuit 120 can include environments 124, such as circuitry representing the environment of the circuit 122 being tested. An environment 124 can include circuitry or design including signals (e.g., 123), interfaces, inputs or outputs with which the circuit 122 (e.g., design under test) interacts. Circuit emulator 140 can test, simulate or emulate any functionality of a circuit 122, such as, for example a data processing circuitry, input or output circuitry, wireless communication circuitry and/or correct implementations of a communication protocol, in isolation or in the context of surrounding environments 124 in which the circuit 122 can operate. Circuit emulator 140 can compile and process different test designs of the circuit design 120, including import or map to a synthesized test design, or to operate, communicate, or interact with built-in verification components to test a functional circuit 122. Circuit emulator 140 can include a variety of hardware components such as processor(s), FPGA(s), dedicated components such as ASIC, and/or other devices that can be used to run emulations or tests 114 of a circuit design 120. Circuit emulator 140 can operate on a virtualizer that can run one or more operating systems on a host machine (e.g., a server or a cloud-based system).

Test 114 can include any assertion coverage testing implemented by ACF 108. Test 114 can include a mutation coverage test, such as a test in which signals 132 are mutated using set input values 134. Test 114 can utilize or involve selectors 142 to set particular input values 134 for particular signals 132 of the circuits 122 of the circuit design 120 tested in the circuit emulator 140. Test 114 can include or involve incremental SAT queries, such as those performed by the ACF 108 over the course of multiple cycles 112 corresponding to i values of a while loop, during which signals 132 and assertions 130 are tested, covered or validated and removed from the collection or list of signals 132 and assertions 130 to be validated. Test 114 can be implemented in a while loop, do while loop, a for loop or any other technique to ensure that it runs until either all signals 132 or all assertions 130 have been covered or tested (e.g., failed or verified).

Signals 132 can include any electromagnetic or electric current/voltage carrying or denoting data corresponding to a design circuit 120 (e.g., circuit 122). Signal 132 can include an input or an output signal of a circuit 122 tested in a circuit emulator 140. Signal 132 can include a select signal (e.g., of a multiplexer or demultiplexer) an encoding or decoding signal, a control signal, a data signal, an input bit-line, a power signal or any other signal 132 in a design circuit 120 or in communication with the design circuit 120.

Input values 134 can include any values of a signal 132. Input value 134 can include, for example, a high (e.g., a digital value of 1) or a low (e.g., digital value of 0) of a particular signal 132. Input value 134 can include a value of an input signal (e.g., 5V, 3V or 0V or ground signal). Input value 134 can include an input value from a driver circuit or an input bit-line. Input value 134 can be set by the ACF 108 during a test 114 in order to create a mutation point (e.g., mutate the particular signal 132).

Selector 142 can include any combination of hardware and software for selecting between multiple input or output signals. Selector 142 can include or involve a multiplexer circuit, such as a circuit that selects between multiple analog or digital input signals and forwards the selected input to a single output line (e.g., providing a signal value 134). Selector 142 can select between multiple groups of input signals and forward a selected group of output signals (e.g., multiple signal values 134 for multiple signals). In some embodiments, the selector 142 can include a demultiplexer circuit.

Assertion 130 can include any combination of hardware and software providing, indicating or representing an expression, such as a Boolean expression, that can indicate whether a particular logic is true or false. Assertion 130 can include a Boolean expression at a specific point in a test 114 or a design circuit 120. The Boolean expression of the assertion 130 can be true, unless there is a bug or an error in the program. Assertion can include an expression that describes the logic of the code being tested (e.g., test 114 of the design circuit 120). Assertion 130 can be used to detect an error in logic, performance of a design circuit 120 or coverage of a simulation or a test 114 performed by the circuit emulator 140 on a circuit design 120.

Counter function 144 can include any function performing a counting functionality for the test 114. Counter function 144 can include the functionality for providing an integer count/increment of a loop, such as a while loop, do-while loop or a for loop. Counter function 144 can keep track of an integer value (e.g., value "i") and provide counts indicative of the cycle 112 of the particular SAT query. Counter function 144 can be synchronized with the cycles 112 of the clock 110. In some embodiments, counter function 144 is independent form the cycles 112 of the clock (e.g., a single count of the counter function 144 corresponds to multiple clock 110 cycles 112, or vice versa).

The example system 100 can utilize as inputs to a test 114 for mutation coverage determination of a circuit design 120 any number of assertions 130 and signals 132 to be verified. The present solution can execute instructions for performing ACF 108 functionality in the context of a mutated circuit design 120 with modified environments 124. The modified environments 124 can include, reflect or implement the assumption that exactly one of the mutation points remains high and that all mutation points are stable (e.g., every mutation point remains constant for the entire execution of the sequential circuit). The system 100 can verify for each signal 132 if there is a counterexample (e.g., alternative solution to the expected solution) for any assertion 130 for which the mutation point expected to remain high remains high throughout the counterexample.

The system 100 can implement a single SAT instance, which at the ith iteration represents the unrolled model (e.g., the sequential circuit 122 and the environment 124) up to a cycle "i" and as the instance is built incrementally (e.g., cycle by cycle), the same axiom clauses used at prior "i" iterations can be accounted for, reused or included at the upcoming iterations (e.g., iteration "i+1"). Accordingly, the learned, covered, verified or otherwise considered clauses acquired or established while solving the SAT instance can be used at subsequent solves (e.g., "i" cycles) within the same iteration, or across subsequent iterations.

For example, system 100 can be configured to perform incremental mutation coverage testing of a circuit design 120. System 100 can include at least one processor 104 coupled with memory 106 and configured to identify, for a current cycle (e.g., a while loop cycle) of a plurality of cycles of a test for a circuit, a first signal 132 of one or more signals 132 for the circuit 122 or circuit design 120. The first signal 132 can be a signal 132 not covered during one or more preceding cycles 112 (e.g., of a while loop) of the plurality of cycles (e.g., of the while loop) preceding the current cycle 112.

The at least one processor 104 can be configured to select, for the current cycle 112, a first value 134 for the first signal 132. The first value 134 can be a value selected by a selector 142 to test, verify or cover the first signal 132 during the current cycle 112. The at least one processor 104 can be configured to determine, in response to the first value 134 selected for the first signal 132 for the circuit (e.g., 120), whether the first signal 132 is covered by the test 114 in the current cycle 112.

For example, the at least one processor 104 can be configured to identify, in response to the first value 134 selected for the first signal 132 for the circuit (e.g., 120), whether a first assertion 130 of a plurality of assertions 130 not covered during the one or more preceding cycles 112 is covered by the test 114 in the current cycle 112. For example, the test ACF 108 can include and/or maintain a list or collection of signals 132 and/or assertions 130 to test, verify or cover during the test 114. The at least one processor 104 can be configured to update the one or more signals 132 to remove the first signal 132 from the one or more signals 132 (e.g., to be tested) if the first signal 132 is determined to be covered by the test 114. The at least one processor 104 can be configured to update the one or more assertions 130 to remove the first assertion 130 from the one or more assertions 130 (e.g. to be tested) if the first assertion 130 is determined to be covered by the test 114.

The at least one processor 104 can be configured to identify, for a next cycle following the current cycle (e.g., of a while loop of the iterative test 114), a second signal 132 from the updated one or more signals 132 for the circuit. For example, the second signal 132 can be selected from a list of signals not yet tested by the test 114 in the current or previous cycles 112. The test 114 can include a mutation coverage test 114 for the circuit (e.g., 122) implemented in a hardware description language (HDL) and integrated with one or more verification environment 124 components. The assertion 130 can include a System Verilog Assertion (SVA) function or an expression corresponding to one or more cycles 112 of a clock 110 of the circuit (e.g., 122).

The at least one processor 104 can be configured to set, for the duration of the cycle 112, the first signal 132 to a mutated signal value 134. The at least one processor 104 can be configured to determine that the first signal 132 is covered by the test 114 based on the mutated signal value 134 remaining unchanged for the duration of the current cycle 112 or for the duration of the current cycle 112 and a duration of any preceding cycles 112. The at least one processor 104 can be configured to identify that the first assertion 130 is covered by the test 114 based on the first assertion 130 verifying the first signal 132. The first assertion 130 can verify the first signal 132 by failing the test (e.g., encountering a counterexample) to the Boolean expression of the first assertion 130.

The at least one processor 104 can be configured to provide a current counter value from a plurality of counter values (e.g., of a while loop, do-while loop or a for loop counter). Each counter value can correspond to a cycle 112 of the plurality of cycles 112. The current counter value can corresponding to the current cycle 112 of the plurality of cycles 112 (e.g., a counter value of a loop of a plurality of loop counter values). The at least one processor 104 can be configured to identify the first signal 132 according to the current counter value.

The at least one processor 104 can be configured to increase the current counter value to a next counter value of the plurality of counter values. The at least one processor 104 can be configured to determine whether the next counter value remains below a threshold of the counter values. The at least one processor 104 can be configured to identify, responsive to the next counter value remaining below the threshold of the counter values, a second signal 132 of the updated one or more signals 132 to use during the next cycle 112 of the test 114.

The at least one processor 104 can be configured to select, for a next cycle 112 following the current cycle 112, the first value 134 for a second signal 132 of the updated one or more signals 132. The at least one processor 104 can be configured to determine, in response to the first value 134 selected for the second signal 132 for the circuit (e.g., 120), whether the second signal 132 is covered by the test in the next cycle 112. The at least one processor 104 can be configured to identify, in response to the first value 134 selected for the second signal 132 for the circuit, whether a second assertion

130 of the updated one or more assertions 130 is covered by the test in the next cycle 112. The at least one processor 104 can be configured to update the updated one or more signals 132 to remove the second signal 132 from the one or more signals 132 if the second signal 132 is determined to be covered by the test 114. The at least one processor 104 can be configured to update the updated one or more assertions 130 to remove the second assertion 130 from the one or more assertions 130 if the second assertion is determined to be covered by the test 114.

For example, the present solution can include a non-transitory computer readable medium storing program instructions in a memory 106. The instructions can be instructions for causing at least one processor 104 to identify, for a current cycle 112 of a plurality of cycles 112 of a test 114 for a circuit 120, a first signal 132 of one or more signals 132 for the circuit (e.g., 120). The first signal 132 is not covered during one or more preceding cycles 112 of the plurality of cycles 112 preceding the current cycle 112. The instructions can be instructions for causing at least one processor 104 to select, for the current cycle 112, a first value 134 for the first signal 132. The instructions can be instructions for causing at least one processor 104 to determine, in response to the first value 134 selected for the first signal 132 for the circuit (e.g., 120), whether the first signal 132 is covered by the test 114 in the current cycle 112. The instructions can be instructions for causing at least one processor 104 to identify, in response to the first value 134 selected for the first signal 132 for the circuit, whether a first assertion 130 of a plurality of assertions 130 not covered during the one or more preceding cycles 112 is covered by the test 114 in the current cycle 112. The instructions can be instructions for causing at least one processor 104 to update the one or more signals 132 to remove the first signal 132 from the one or more signals 132 if the first signal 132 is determined to be covered by the test 114. The instructions can be instructions for causing at least one processor 104 to update the one or more assertions 130 to remove the first assertion 130 from the one or more assertions 130 if the first assertion 130 is determined to be covered by the test 114. The instructions can be instructions for causing at least one processor 104 to identify, for a next cycle 112 following the current cycle 112, a second signal 132 from the updated one or more signals 132 for the circuit (e.g., 120).

The instructions can be instructions for causing at least one processor 104 to set/hold/maintain, for the duration of the cycle 112, the first signal 132 to a mutated signal value 134. The instructions can be instructions for causing at least one processor 104 to determine that the first signal 132 is covered by the test 114 based on the mutated signal value 134 remaining unchanged for the duration of the current cycle 112.

Figure 2:
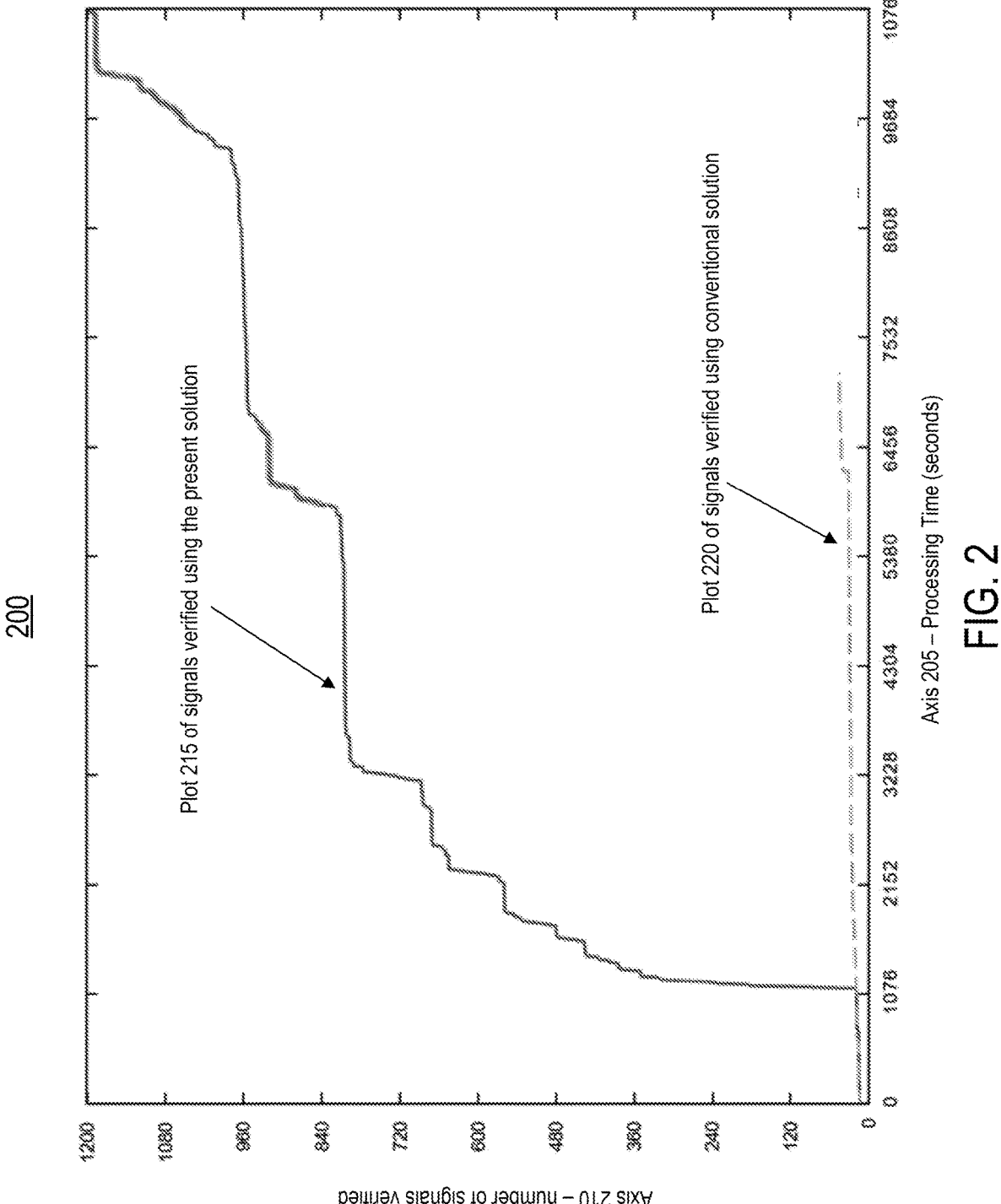
FIG. 2 is an example plot of a number of signals verified over time using the present solution in comparison with the number of signals verified over the same time period using prior mutation coverage techniques.

FIG. 2 illustrates an example graph 200 having an axis 205 (e.g., X-axis) corresponding to the time for processing mutation coverage of signals 132 (e.g., in the time unit of seconds) and an axis 210 (e.g., Y-axis) corresponding to a number of signals 132 verified (e.g., in the unit of the number of signals 132 processed). Graph 200 includes a plot 215 of a mutation coverage dataset for the example of graph 200, corresponding to a number of signals 132 verified using the present solution of the mutation coverage determination via incremental SAT queries. Graph 200 also includes a plot 220 representing a number of signals verified for the same dataset using a conventional mutation coverage solution. As shown in graph 200, plot 215 indicates that the present solution processes signals 132 at a faster rate than the conventional solution of the plot 220. For example, at around 4303 seconds of the processing time, the present solution at the plot 215 shows around 800 signals 132 processed, whereas the conventional solution appears to be at less than around 50 signals 132 processed. Likewise, at around second 9684 the present solution is at around 1000 signals 132 processed, while the present solution appears to approach about 80 signals 132 processed. Accordingly, for the present data set, the present solution provides a more efficient and faster solution for mutation coverage of a design circuit than that of the conventional solution.

Figure 3:
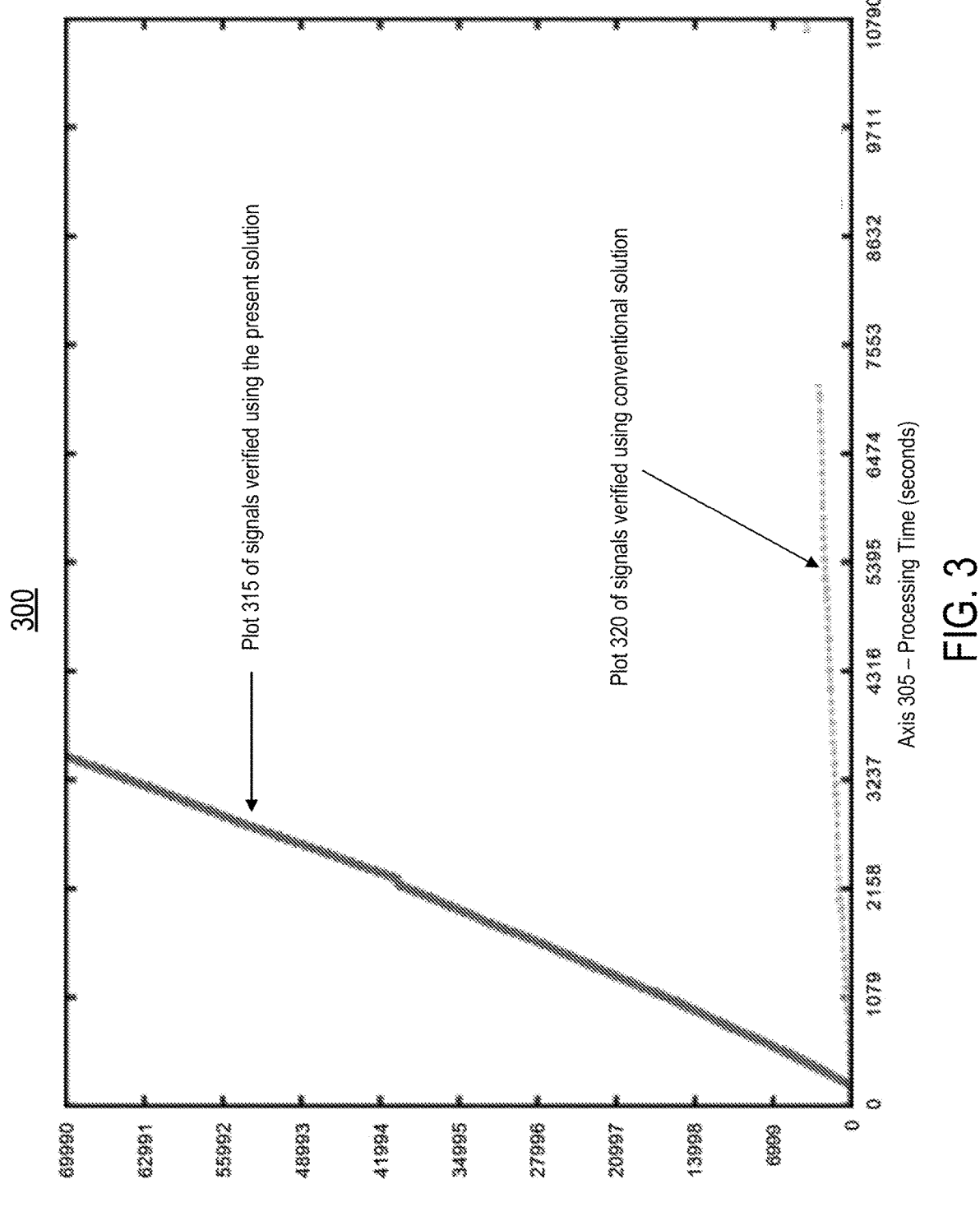
FIG. 3 is another example plot of a number of signals verified over time using the present solution in comparison with the number of signals verified over the same time period using prior mutation coverage techniques.

FIG. 3 illustrates an example graph 300 having an axis 305 (e.g., X-axis) corresponding to the time for processing mutation coverage of signals 132 (e.g., in the time unit of seconds). Axis 310 of graph 300 (e.g., Y-axis) corresponds to a number of signals 132 verified (e.g., in the unit of the number of signals 132 processed). Graph 300 includes a plot 315 of a mutation coverage dataset for the example of graph 300, corresponding to a number of signals 132 verified using the present solution of the mutation coverage determination via incremental SAT queries. Plot 320 of the graph 300 represents a number of signals verified for the same dataset using a conventional mutation coverage solution. As shown in graph 300, plot 315 indicates that the present solution processes signals 132 at a faster rate than the conventional solution of the plot 320. For example, at around 3237 seconds of processing time, the present solution at the plot 315 shows around 62991 signals 132 processed, whereas the conventional solution appears to be at less than 1000 signals 132 processed. Accordingly, for this illustrated data set, the present solution provides a more efficient and faster solution for mutation coverage of a design circuit than that of the conventional solution.

Figure 4:
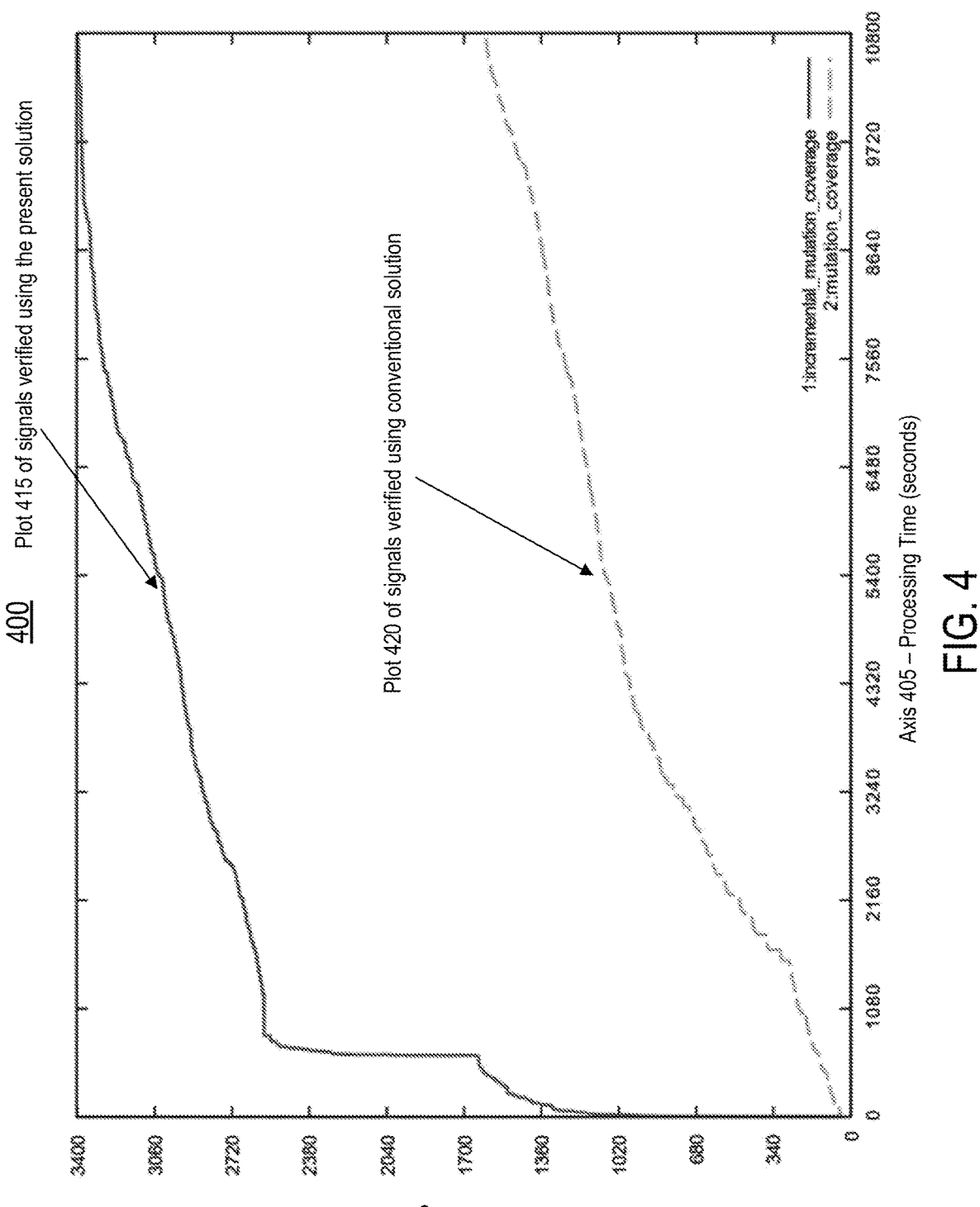
FIG. 4 is another example plot of a number of signals verified over time using the present solution in comparison with the number of signals verified over the same time period using prior mutation coverage techniques.

FIG. 4 illustrates an example graph 400 having an axis 405 (e.g., X-axis) corresponding to the time for processing mutation coverage of signals 132 (e.g., in the time unit of seconds). Axis 410 of graph 400 (e.g., Y-axis) corresponds to a number of signals 132 verified (e.g., in the unit of the number of signals 132 processed). Graph 400 includes a plot 415 of a mutation coverage dataset for the example of graph 400, corresponding to a number of signals 132 verified using the present solution of the mutation coverage determination via incremental SAT queries. As in the prior examples, plot 420 of the graph 400 represents a number of signals verified for the same dataset using a conventional mutation coverage solution. As shown in graph 400, plot 415 indicates that the present solution processes signals 132 at a faster rate than the conventional solution of the plot 420. For example, at around 1080 seconds of processing time, the present solution at the plot 415 shows around 2500 signals 132 processed, whereas the conventional solution appears to be at about 170 signals 132 processed. Accordingly, for this illustrated data set, the present solution provides a more efficient and faster solution for mutation coverage of a design circuit than that of the conventional solution.

Figure 5:
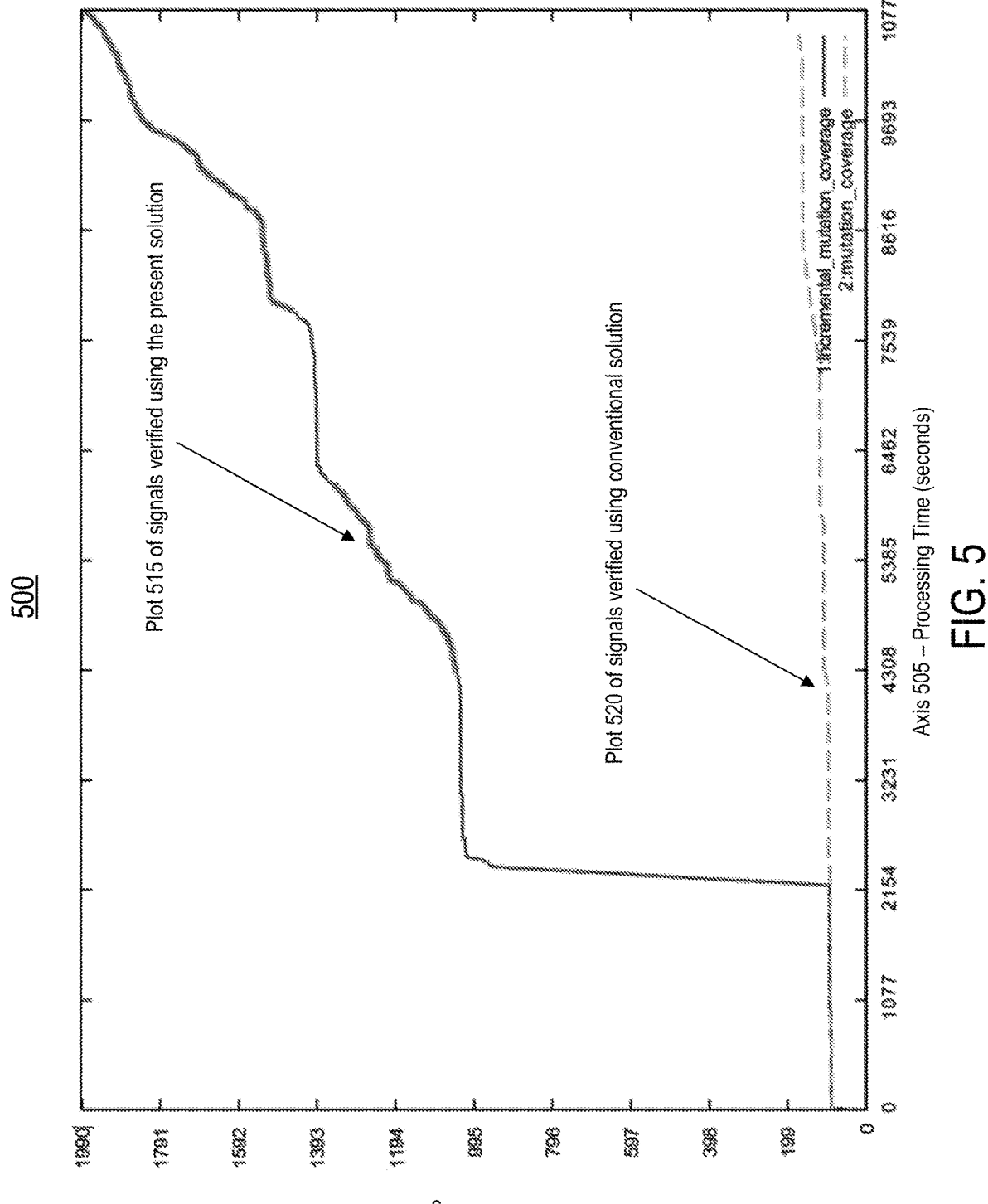
FIG. 5 is another example plot of a number of signals verified over time using the present solution in comparison with the number of signals verified over the same time period using prior mutation coverage techniques.

FIG. 5 illustrates an example graph 500 having an axis 505 (e.g., X-axis) corresponding to the time for processing mutation coverage of signals 132 (e.g., in the time unit of seconds). Axis 510 of graph 400 (e.g., Y-axis) corresponds to a number of signals 132 verified (e.g., in the unit of the number of signals 132 processed). Graph 500 includes a plot 515 of a mutation coverage dataset for the example of graph 500 corresponding to a number of signals 132 verified using the present solution of the mutation coverage determination via incremental SAT queries. As in the prior examples, plot 520 of the graph 500 represents a number of signals verified for the same dataset using a conventional mutation coverage solution. As shown in graph 500, plot 515 indicates that the present solution processes signals 132 at a faster rate than the conventional solution of the plot 520. For example, at around 4308 seconds of processing time, the present solution at the plot 515 shows around 1000 signals 132 processed, whereas the conventional solution appears to be at about 100 signals 132 processed. Accordingly, for this illustrated data set, the present solution provides a more efficient and faster solution for mutation coverage of a design circuit than that of the conventional solution.

FIG. 6 is an example flow diagram of a method 600 method for performing incremental mutation coverage testing of a circuit, in accordance with the embodiments of the present solution. Method 600 can include acts 602 through 614 that can be implemented, for example, using the system 100 of FIG. 1 and in view of the discussion in connection with plots 300-500 of FIGS. 2-5. For example, at 602, the method can identify for a current cycle a signal not yet covered by the test. At 604, the method can select a value for the signal. At 606, the method can determine if the signal is covered by the current cycle of the test. At 608, the method can identify if an assertion is covered by the current cycle of the test. At 610, the method can update the list of signals to be tested. At 612, the method can update the list of assertions to be tested. At 614, the method can identify, for the next cycle, another signal not yet covered by the test.

At 602, the method can include identifying for a current cycle a signal not yet covered by the test. The method can be for incremental mutation coverage testing of a circuit. The method can include at least one processor performing a current cycle of a plurality of cycles of a test for a circuit. The method can include the at least one processor identifying a first signal of one or more signals for the circuit. The first signal can be a signal not covered during one or more preceding cycles of the plurality of cycles preceding the current cycle.

The test can be a mutation coverage test for the circuit implemented in a hardware description language (HDL) and integrated with one or more verification environment components. The cycle can include a cycle of a processing loop, such as a while loop, a do-while loop or a for loop. The cycle can correspond to a clock cycle of a process simulated by a circuit emulator. The cycle can include testing, verifying and/or determining coverage of one or more signals or one or more assertions corresponding to a design circuit under test.

The at least one processor can provide a current counter value from a plurality of counter values corresponding to the plurality of cycles. The current counter value can correspond to the current cycle, such as a while loop cycle and/or a clock cycle of a circuit processed. The one or more processors can identify the first signal according to the current counter value. For example, the first signal can correspond to a first value of a cycle being processed, tested or verified.

At 604, the method can include selecting a value for the signal. The method can include the at least one processor selecting, for the current cycle, a first value for the first signal. The first value can include a value selected for the signal being tested or verified. The first value can be a value selected by a selector circuit. The first value can correspond to a high value, such as a signal corresponding to a digital value of 1. The first value can correspond to a low value, such as a signal corresponding to a digital value of zero. The first value can be set or established for a duration of cycle.

At 606, the method can include determining if the signal is covered by the current cycle of the test. The method can include at least one processor determining whether the first signal is covered by the test in the current cycle. The at least one processor can determine whether first signal is covered in the current cycle in response to the first value selected for the first signal for the circuit. For example, the assertion coverage function can determine if the first signal is covered by the current cycle (e.g., while loop) of the test in response to the first value remaining unchanged for the duration of the processing of the current cycle. For example, the assertion coverage function can determine if the first signal is covered by the current cycle (e.g., while loop) of the test in response to the first value remaining high for the duration of the processing of the current cycle. For example, the assertion coverage function can determine if the first signal is covered by the current cycle (e.g., while loop) of the test in response to the first value remaining low for the duration of the processing of the current cycle.

The method can include the at least one processor setting, for the duration of the cycle, the first signal to a mutated signal value. The mutated signal value can be a high value (e.g., digital value of one). The mutated signal value can be a low value (e.g., digital value of zero). The mutated signal value can be a value selected by a multiplexer from another portion of the circuit or environment of the design circuit. The at least one processor can determine that the first signal is covered by the test based on the mutated signal value remaining unchanged for the duration of the current cycle.

At 608, the method can include identifying if an assertion is covered by the current cycle of the test. The method can include the at least one processor identifying whether a first assertion of a plurality of assertions not covered during the one or more preceding cycles is covered by the test in the current cycle. The at least one processor can identify whether the first assertion is covered in response to the first value selected for the first signal for the circuit. For example, the at least one processor can determine if the first assertion is verified or has failed in response to the first value selected for the first signal and can determine that the first assertion is covered by the mutation coverage test, responsive to the first assertion being verified or failing.

The assertion can include a System Verilog Assertion (SVA) corresponding to one or more cycles of a clock of the circuit. The assertion can include a Boolean satisfiability function to be tested as true or false in response to the first value input into the circuit for the first signal. The at least one processor can identify that the first assertion is covered by the test based on the first assertion verifying the first signal. The at least one processor can identify that the first assertion is covered by the test based on the first assertion failing the test (e.g., encountering a counterexample for the first assertion) in accordance with the first signal.

At 610, the method can include updating the list of signals to be tested. The method can include the at least one processor updating the one or more signals to remove the first signal from the one or more signals if the first signal is determined to be covered by the test. For example, the assertion coverage function can maintain a list of all signals to be tested, verified or covered during the mutation coverage test. The assertion coverage function can keep track of the list of signals to be covered, tested or verified and remove signals from the list as they are covered, tested or verified during the test. For example, the assertion coverage function can remove the first signal from the list of the signals to be tested, verified or covered during the mutation coverage test in response to determining that the first signal is covered by the test at act 608.

At 612, the method can include updating the list of assertions to be tested. The method can include the at least one processor updating the one or more assertions to remove the first assertion from the one or more assertions if the first assertion is determined to be covered by the test. For example, the assertion coverage function can maintain a list of all assertions to be tested, verified or covered during the mutation coverage test. The assertion coverage function can keep track of the list of assertions to be covered, tested or verified and remove individual assertions from the list as they are covered, tested or verified during the test. For example, the assertion coverage function can remove the first assertion from the list of the assertions to be tested, verified or covered during the mutation coverage test in response to determining that the first assertion is covered by the test at act 608. The first assertion can be covered by the test in response to the first assertion failing the test (e.g., encountering a counterexample).

At 614, the method can include identifying, for the next cycle, another signal not yet covered by the test. The method can include the at least one processor identifying, for a next cycle following the current cycle, a second signal from the updated one or more signals for the circuit. For example, the at least one processor can increase the current counter value to a next counter value of the plurality of counter values. The at least one processor can determine whether the next counter value remains below a threshold of the counter values. The at least one processor can identify, responsive to the next counter value remaining below the threshold of the counter values, a second signal of the updated one or more signals to use during the next cycle of the test.

The at least one processor can select, for a next cycle following the current cycle, the first value for a second signal of the updated one or more signals. The at least one processor can determine, in response to the first value selected for the second signal for the circuit, whether the second signal is covered by the test in the next cycle. The at least one processor can identify, in response to the first value selected for the second signal for the circuit, whether a second assertion of the updated one or more assertions is covered by the test in the next cycle.

The at least one processor can keep updating the list of signals and/or assertions to verify, test or cover. For example, the at least one processor can update the updated one or more signals to remove the second signal from the one or more signals if the second signal is determined to be covered by the test. The at least one processor can update the updated one or more assertions to remove the second assertion from the one or more assertions if the second assertion is determined to be covered by the test.

Upon completing the act 614, the method can proceed to act 604 to continue the processing of the one or more signals and/or assertions for the next cycle (e.g., while loop cycle, do-while loop cycle or the for loop cycle). The method can continue cycling through acts 604 through 614 until at least an upper limit of the loop (e.g., while loop) is reached, or until at least the list of signals or the list of assertions to test, verify or cover is exhausted (e.g., until at least all signals or all assertions are covered).

Figure 7:
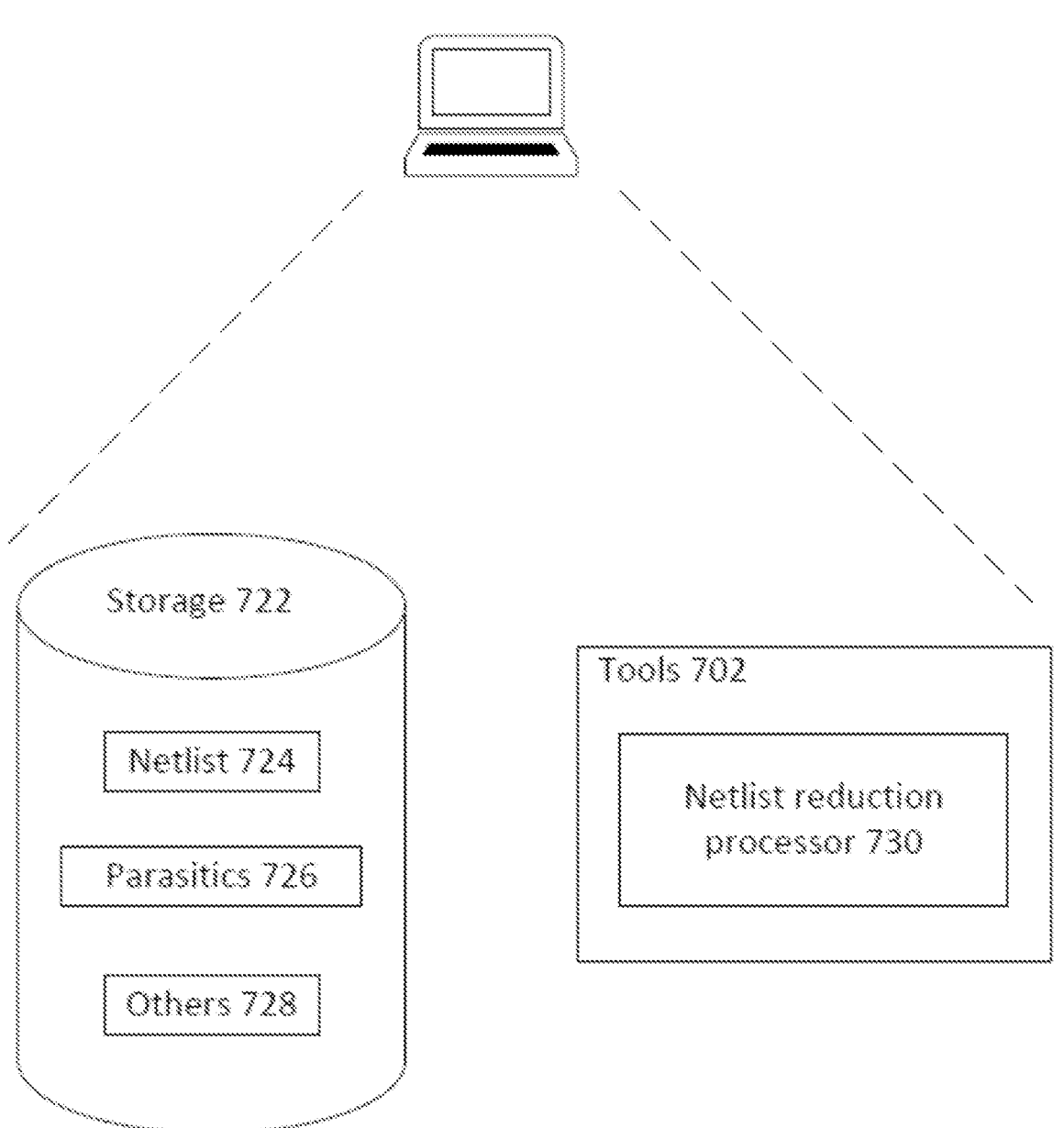
FIG. 7 illustrates an example computing system for implementing the features and embodiments of the present solution.

FIG. 7 is a functional block diagram of an example computing system 700 for configuring switches for verification IP, according to the present embodiments. In some embodiments, the system 700 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 700 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, a synthesis tool, a simulator/verification-tool, and/or a floor-planner, as can be appreciated by those skilled in the art.

In one or more embodiments, the computing system 700 may further write to and read from a local or remote volatile or non-volatile computer accessible storage 722 that stores thereon data or information such as, but not limited to, one or more databases such as post-placement layouts, schematic design database(s) or physical design database(s) (e.g., GDS II or OASIS data, etc.), circuit stage credit database 724, libraries, rule decks, constraints (e.g., timing constraints such as required arrival time, etc.), etc. 726, and/or other information or data 728 (e.g., netlists, derates, parasitic data, SDF, etc.) that may be required to support the methodology of the present embodiments. According to certain aspects, the databases and libraries in the storage 722 are extendable or changeable (e.g., via APIs and the like) without changing other components or data in system 700.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 700 may, by various standalone software, hardware modules or combinations thereof 702 (e.g., EDA tool), include a processor 116 that executes the processes and approaches discussed above to configure or dynamically reconfigure a switch for emulation with verification IP. The processor 116 can execute the method 600 and approaches discussed above in relation to FIGS. 1-6. The processor 116 may be implemented by adapting or communicating with certain pre-existing modules (e.g., design workflow, design timing, design optimization, design sign-off, etc.) as may be required to implement a methodology to creating and configuring switches for protocols to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A system to perform incremental mutation coverage testing of a circuit, the system comprising:
at least one processor coupled with memory and configured to:
identify, for a current cycle of a plurality of cycles of a test for a circuit, a first signal of one or more signals for the circuit, the first signal not covered during one or more preceding cycles of the plurality of cycles;
select, for the current cycle, a first value for the first signal;
determine, in response to the first value selected for the first signal for the circuit, whether the first signal is covered by the test in the current cycle;

identify, in response to the first value selected for the first signal for the circuit, whether a first assertion of a plurality of assertions not covered during the one or more preceding cycles is covered by the test in the current cycle;

update the one or more signals to remove the first signal from the one or more signals if the first signal is determined to be covered by the test;

update the one or more assertions to remove the first assertion from the one or more assertions if the first assertion is determined to be covered by the test; and identify, for a next cycle following the current cycle, a second signal from the updated one or more signals for the circuit.

2. The system of claim 1, wherein the test is a mutation coverage test for the circuit implemented in a hardware description language (HDL) and integrated with one or more verification environment components.

3. The system of claim 2, wherein the assertion includes a System Verilog Assertion (SVA) corresponding to one or more cycles of a clock of the circuit.

4. The system of claim 1, wherein the at least one processor is configured to:

set, for the duration of the cycle, the first signal to a mutated signal value; and determine that the first signal is covered by the test based on the mutated signal value remaining unchanged for the duration of the current cycle.

5. The system of claim 1, wherein the at least one processor is configured to identify that the first assertion is covered by the test based on the first assertion verifying the first signal.

6. The system of claim 1, wherein the at least one processor is configured to:

provide a current counter value from a plurality of counter values corresponding to the plurality of cycles, the current counter value corresponding to the current cycle; and identify the first signal according to the current counter value.

7. The system of claim 6, wherein the at least one processor is configured to:

increase the current counter value to a next counter value of the plurality of counter values;

determine whether the next counter value remains below a threshold of the counter values; and identify, responsive to the next counter value remaining below the threshold of the counter values, a second signal of the updated one or more signals to use during the next cycle of the test.

8. The system of claim 1, wherein the at least one processor is configured to:

select, for a next cycle following the current cycle, the first value for a second signal of the updated one or more signals;

determine, in response to the first value selected for the second signal for the circuit, whether the second signal is covered by the test in the next cycle;

identify, in response to the first value selected for the second signal for the circuit, whether a second assertion of the updated one or more assertions is covered by the test in the next cycle;

update the updated one or more signals to remove the second signal from the one or more signals if the second signal is determined to be covered by the test; and update the updated one or more assertions to remove the second assertion from the one or more assertions if the second assertion is determined to be covered by the test.

9. A method comprising:

determining, by at least one processor performing a current cycle of a plurality of cycles of a test for a circuit, a first signal of one or more signals for the circuit, the first signal not covered during one or more preceding cycles of the plurality of cycles;

determining, by the at least one processor for the current cycle, a first value for the first signal;

determining, by the at least one processor in response to the first value selected for the first signal for the circuit, whether the first signal is covered by the test in the current cycle;

identifying, by the at least one processor in response to the first value selected for the first signal for the circuit, whether a first assertion of a plurality of assertions not covered during the one or more preceding cycles is covered by the test in the current cycle;

updating, by the at least one processor, the one or more signals to remove the first signal from the one or more signals if the first signal is determined to be covered by the test;

updating, by the at least one processor, the one or more assertions to remove the first assertion from the one or more assertions if the first assertion is determined to be covered by the test; and identifying, by the at least one processor for a next cycle following the current cycle, a second signal from the updated one or more signals for the circuit.

10. The method of claim 9, wherein the test is a mutation coverage test for the circuit implemented in a hardware description language (HDL).

11. The method of claim 10, wherein the assertion includes a System Verilog Assertion (SVA).

12. The method of claim 9, further comprising:

setting, by the at least one processor for the duration of the cycle, the first signal to a mutated signal value; and determining, by the at least one processor, that the first signal is covered by the test based on the mutated signal value remaining unchanged for the duration of the current cycle.

13. The method of claim 9, further comprising:

identifying, by the at least one processor, that the first assertion is covered by the test based on the first assertion verifying the first signal.

14. The method of claim 9, further comprising:

providing, by the at least one processor, a current counter value from a plurality of counter values corresponding to the plurality of cycles, the current counter value corresponding to the current cycle; and identifying, by the one or more processors, the first signal according to the current counter value.

15. The method of claim 14, further comprising:

incrementing, by the at least one processor, the current counter value to a next counter value of the plurality of counter values;

determining, by the at least one processor, whether the next counter value remains below a threshold of the counter values; and identifying, by the at least one processor responsive to the next counter value remaining below the threshold of the counter values, a second signal of the updated one or more signals to use during the next cycle of the test.

16. The method of claim 9, further comprising:

selecting, by the at least one processor for a next cycle following the current cycle, the first value for a second signal of the updated one or more signals;

determining, by the at least one processor in response to the first value selected for the second signal for the circuit, whether the second signal is covered by the test in the next cycle;

identifying, by the at least one processor in response to the first value selected for the second signal for the circuit, whether a second assertion of the updated one or more assertions is covered by the test in the next cycle;

updating, by the at least one processor, the updated one or more signals to remove the second signal from the one or more signals if the second signal is determined to be covered by the test; and updating, by the at least one processor, the updated one or more assertions to remove the second assertion from the one or more assertions if the second assertion is determined to be covered by the test.

17. A non-transitory computer readable medium storing program instructions for causing at least one processor to:

identify, for a current cycle of a plurality of cycles of a test for a circuit, a first signal of one or more signals for the circuit, the first signal not covered during one or more preceding cycles of the plurality of cycles;

determine, for the current cycle, a first value for the first signal;

determine, in response to the first value selected for the first signal for the circuit, whether the first signal is covered by the test in the current cycle;

identify, in response to the first value selected for the first signal for the circuit, whether a first assertion of a plurality of assertions not covered during the one or more preceding cycles is covered by the test in the current cycle;

update the one or more signals to remove the first signal from the one or more signals if the first signal is determined to be covered by the test;

update the one or more assertions to remove the first assertion from the one or more assertions if the first assertion is determined to be covered by the test; and identify, for a next cycle following the current cycle, a second signal from the updated one or more signals for the circuit.

18. The non-transitory computer readable medium of claim 17, wherein the test is a mutation coverage test for the circuit implemented in a hardware description language (HDL).

19. The non-transitory computer readable medium of claim 18, wherein the assertion includes a System Verilog Assertion (SVA).

20. The non-transitory computer readable medium of claim 17, wherein the program instructions further cause the at least one processor to:

set, for the duration of the cycle, the first signal to a mutated signal value; and determine that the first signal is covered by the test based on the mutated signal value remaining unchanged for the duration of the current cycle.

* * * * *